US009231242B2

(12) United States Patent
Sugihara et al.

(10) Patent No.: US 9,231,242 B2
(45) Date of Patent: *Jan. 5, 2016

(54) METHOD FOR PRODUCING NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE PASTE

(71) Applicants: Atsushi Sugihara, Toyota (JP); Takashi Kono, Okazaki (JP); Tsubasa Matsuda, Kariya (JP); Naoyuki Wada, Nagoya (JP); Shuji Tsutsumi, Ikoma (JP); Tatsuya Hashimoto, Osaka (JP)

(72) Inventors: Atsushi Sugihara, Toyota (JP); Takashi Kono, Okazaki (JP); Tsubasa Matsuda, Kariya (JP); Naoyuki Wada, Nagoya (JP); Shuji Tsutsumi, Ikoma (JP); Tatsuya Hashimoto, Osaka (JP)

(73) Assignees: TOYOTA JIDOSHA KABUSHIKI KAISHA, Toyota (JP); JTEKT CORPORATION, Osaka (JP)

( * ) Notice: Subject to any disclaimer, the term of this patent is extended or adjusted under 35 U.S.C. 154(b) by 232 days.

This patent is subject to a terminal disclaimer.

(21) Appl. No.: 13/927,462

(22) Filed: Jun. 26, 2013

(65) Prior Publication Data
US 2014/0001400 A1    Jan. 2, 2014

(30) Foreign Application Priority Data

Jun. 29, 2012  (JP) .................... 2012-147901

(51) Int. Cl.
*H01M 4/04* (2006.01)
*H01M 4/1393* (2010.01)
*H01M 4/62* (2006.01)

(52) U.S. Cl.
CPC .............. *H01M 4/04* (2013.01); *H01M 4/1393* (2013.01); *H01M 4/62* (2013.01); *Y02E 60/122* (2013.01)

(58) Field of Classification Search
CPC ..... H01M 4/04; H01M 4/133; H01M 4/1343; H01M 4/0402; H01M 4/043
USPC ........................ 252/182.1; 429/209; 427/58
See application file for complete search history.

(56) References Cited

U.S. PATENT DOCUMENTS

2008/0199777 A1    8/2008  Onishi et al.
2009/0214954 A1    8/2009  Onishi et al.
(Continued)

FOREIGN PATENT DOCUMENTS

JP    2000348537 A  * 12/2000
JP    2010-092649 A    4/2010
(Continued)

OTHER PUBLICATIONS

Sep. 10, 2015 Office Action issued in U.S. Appl. No. 13/927,527.
(Continued)

*Primary Examiner* — Mark Kopec
*Assistant Examiner* — Danny N Kang
(74) *Attorney, Agent, or Firm* — Oliff PLC

(57) ABSTRACT

A method for producing a non-aqueous electrolyte secondary battery includes: subjecting a mixture of a negative-electrode active material on which oil has been adsorbed, CMC and water to hard kneading to prepare a primary kneaded mixture; diluting the primary kneaded mixture with water to prepare a slurry; and adding a binder to the slurry. The method further includes defining an amount of the oil to a value equal to or more than 50 ml/100 g and equal to or less than 62 ml/100 g, wherein the amount of the oil is an amount at the time when the viscosity characteristics of the negative-electrode active material exhibits 70% of the maximum torque that is generated when the oil is titrated onto the negative-electrode active material. The 1% aqueous solution viscosity of the CMC is defined to a value equal to or more than 6000 mPa·s and equal to or less than 8000 mPa·s.

7 Claims, 3 Drawing Sheets

(56) References Cited

U.S. PATENT DOCUMENTS

2009/0311599 A1* 12/2009 Kawai et al. .................. 429/217
2012/0251888 A1    10/2012 Yamamoto et al.

FOREIGN PATENT DOCUMENTS

| JP | 2011063673 A | * | 3/2011 |
| JP | A-2011-63673 | | 3/2011 |
| JP | 2011-238622 A | | 11/2011 |
| WO | 2010/113783 A1 | | 10/2010 |
| WO | 2012/026462 A1 | | 3/2012 |
| WO | WO 2013/190655 A1 | | 12/2013 |

OTHER PUBLICATIONS

Sep. 29, 2015 Office Action issued in Japanese Patent Application No. 2012-147901 (partial translation).

* cited by examiner

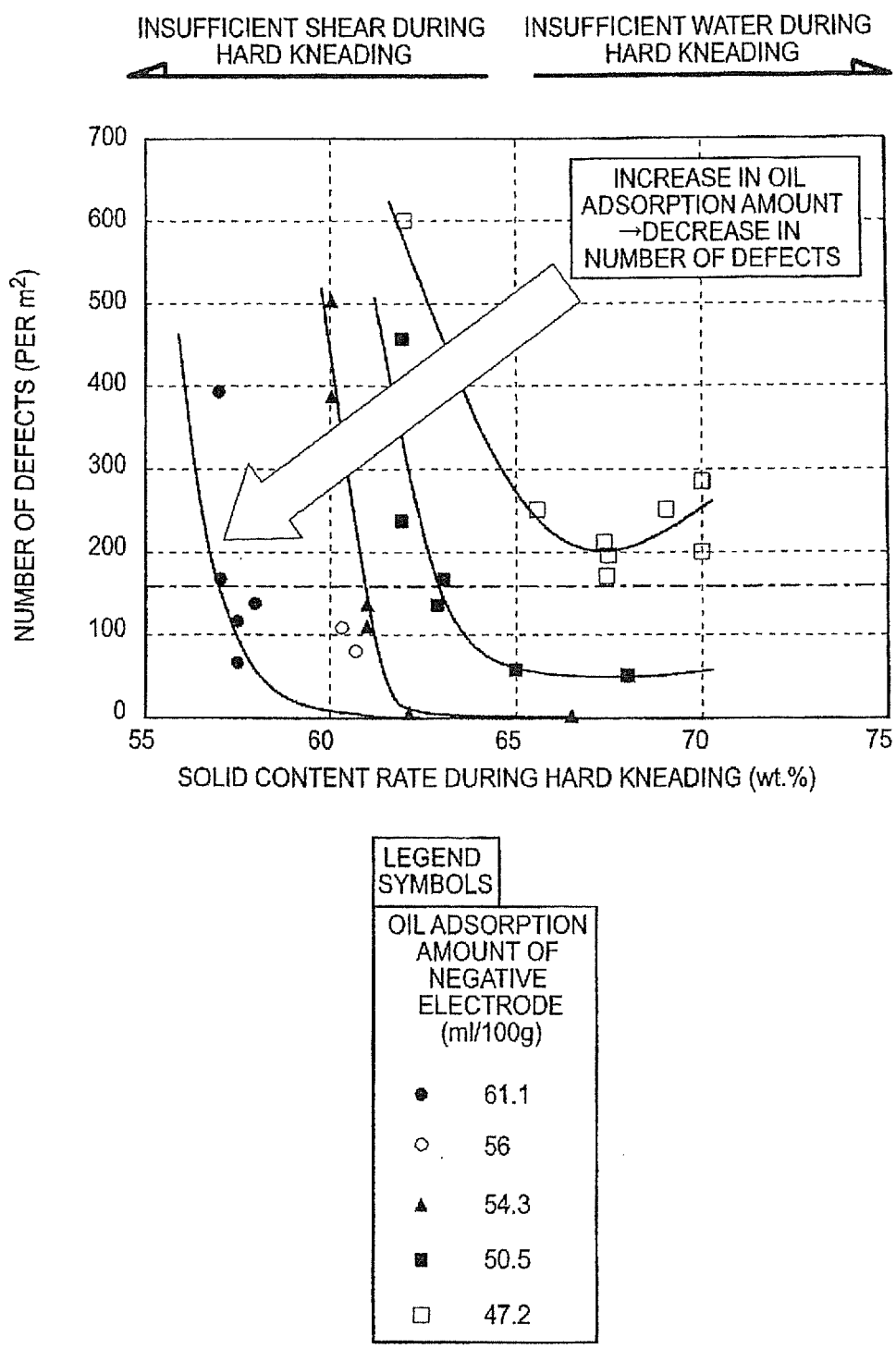

FIG. 3

| | | OIL ADSORPTION AMOUNT | CMC VISCOSITY | PERCENTAGE OF CMC AMOUNT (BASED ON ACTIVE MATERIAL) | NUMBER OF DEFECTS | PEELING STRENGTH | INITIAL RESISTANCE | POST-CYCLE CAPACITY RETENTION RATE |
|---|---|---|---|---|---|---|---|---|
| | | ml/100g | mPa·s | wt% | PER m² | N/m | mΩ | % |
| EXPERIMENT (1) | COMPARATIVE EXAMPLE 1 | 47 | 6500 | 0.7 | 234 | 2.9 | 4.46 | 65 |
| | EXAMPLE 1 | 50 | 6500 | 0.7 | 62 | 2.7 | 4.465 | 91 |
| | EXAMPLE 2 | 54 | 6500 | 0.7 | 24 | 2.4 | 4.44 | 93 |
| | EXAMPLE 3 | 56 | 6500 | 0.7 | 22 | 2.4 | 4.454 | 94 |
| | EXAMPLE 4 | 62 | 6500 | 0.7 | 16 | 2.2 | 4.434 | 93 |
| | COMPARATIVE EXAMPLE 2 | 65 | 6500 | 0.7 | 14 | 1.1 | 4.445 | 78 |
| EXPERIMENT (2) | COMPARATIVE EXAMPLE 3 | 54 | 6500 | 0.5 | 10 | 1.3 | 4.173 | 76 |
| | EXAMPLE 5 | 54 | 6500 | 0.6 | 14 | 2.2 | 4.375 | 93 |
| | EXAMPLE 6 | 54 | 6500 | 0.8 | 48 | 2.7 | 4.563 | 92 |
| | COMPARATIVE EXAMPLE 4 | 54 | 6500 | 1 | 190 | 4.1 | 5.988 | 61 |
| EXPERIMENT (3) | EXAMPLE 7 | 54 | 8000 | 0.7 | 44 | 2.6 | 4.478 | 93 |
| | COMPARATIVE EXAMPLE 5 | 54 | 3500 | 1 | 14 | 2.3 | 5.121 | 71 | ns
METHOD FOR PRODUCING NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE PASTE

INCORPORATION BY REFERENCE

The disclosure of Japanese Patent Application No. 2012-147901 filed on Jun. 29, 2012 including the specification, drawings and abstract is incorporated herein by reference in its entirety.

BACKGROUND OF THE INVENTION

1. Field of the Invention

The present invention relates to a technology for a method for producing a non-aqueous electrolyte secondary battery, a non-aqueous electrolyte secondary battery, and a method for producing a negative electrode paste.

2. Description of Related Art

Non-aqueous electrolyte secondary batteries, such as lithium-ion batteries, for use in hybrid vehicles are required to have excellent output characteristics and cycle characteristics. Conventionally, various techniques have been examined for establishing a simple method for preparing a high-quality paste for electrodes in order to improve output characteristics or cycle characteristics. For example, a related art is disclosed in Japanese Patent Application Publication No. 2011-63673 (JP 2011-63673 A) that is shown below.

JP 2011-63673 A enables an aqueous paste for electrodes to be produced simply by adding a solvent to a mixture of powdery active material particles and carboxymethyl cellulose (CMC).

However, when a non-aqueous electrolyte secondary battery is produced using a paste that is produced according to the related art that is disclosed in JP 2011-63673 A, defects (i.e., defect points) that are derived from CMC may occur in the composite material layer of the negative electrode depending on the physical properties of the negative-electrode active material or some other reasons.

For example, it is effective to reduce the additive amount of CMC that is contained in the negative electrode to produce a high-output non-aqueous electrolyte secondary battery. It is therefore effective to use CMC with a high viscosity (in other words, with a high molecular weight) to reduce the additive amount of CMC. However, CMC with a high viscosity is poorly soluble. When CMC is not dissolved completely during kneading, undissolved CMC may remain in the negative electrode paste and cause defects during coating. Thus, when CMC with a high viscosity is used to improve the output characteristics, the problem of the tendency for defects to occur during coating needs to be solved.

It is known that the solubility of CMC also depends on the amount of oil that has been adsorbed on the negative-electrode active material. For example, when the amount of oil that has been adsorbed on the negative-electrode active material is insufficient, the solid content rate becomes too high (in other words, the amount of water becomes insufficient) during hard kneading to dissolve CMC completely. On the other hand, when the amount of oil that has been adsorbed on the negative-electrode active material is excessive, the adsorption of CMC on the negative-electrode active material increases, resulting in poor peeling strength of the composite material layer of the negative electrode. Then, another problem, the tendency for the cycle characteristics to deteriorate, occurs.

Thus, when CMC with a high viscosity is used in preparing a negative electrode paste, it is necessary to optimize the relationship between the viscosity of CMC and the amount of oil that is adsorbed on the negative-electrode active material in order to dissolve CMC completely and to ensure sufficient peeling strength of the composite material layer.

SUMMARY OF THE INVENTION

The present invention provides a method for producing a non-aqueous electrolyte secondary battery, a non-aqueous electrolyte secondary battery and a method for producing a negative electrode paste which can ensure a high degree of peeling strength even when carboxymethyl cellulose with a high viscosity is used in the negative electrode.

A method for producing a non-aqueous electrolyte secondary battery according to a first aspect of the present invention includes: subjecting a mixture of a negative-electrode active material on which oil has been adsorbed, carboxymethyl cellulose and water to hard kneading to prepare a primary kneaded mixture; diluting the primary kneaded mixture with water to prepare a slurry; adding a binder to the slurry to prepare a negative electrode paste; defining an amount of the oil that is adsorbed on the negative-electrode active material to a value equal to or more than 50 ml/100 g and equal to or less than 62 ml/100 g, wherein the amount of the oil is an amount at the time when the viscosity characteristics of the negative-electrode active material exhibits 70% of the maximum torque that is generated when the oil is titrated onto the negative-electrode active material; and defining the 1% aqueous solution viscosity of the carboxymethyl cellulose to a value equal to or more than 6000 mPa·s and equal to or less than 8000 mPa·s.

In the first aspect of the invention, the method may further include defining an amount of use of the carboxymethyl cellulose so that a percentage by weight of the carboxymethyl cellulose based on the total weight of the negative-electrode active material, the carboxymethyl cellulose and the binder that are contained in the negative electrode paste is equal to or more than 0.6% and equal to or less than 0.8%.

In the first aspect of the invention, the method may further include adjusting a solid content rate during the hard kneading to the primary kneaded mixture to a value equal to or less than 70%.

A second aspect of the present invention provides a non-aqueous electrolyte secondary battery which includes a negative electrode that is produced from the negative electrode paste that is prepared by the production method according to the first aspect of the present invention.

A method for producing a negative electrode paste according to a third aspect of the present invention includes: subjecting a mixture of a negative-electrode active material on which oil has been adsorbed, carboxymethyl cellulose and water to hard kneading to prepare a primary kneaded mixture; diluting the primary kneaded mixture with water to prepare a slurry; adding a binder to the slurry; defining an amount of the oil that is adsorbed on the negative-electrode active material to a value equal to or more than 50 ml/100 g and equal to or less than 62 ml/100 g, wherein the amount of the oil is an amount at the time when the viscosity characteristics of the negative-electrode active material exhibits 70% of the maximum torque that is generated when the oil is titrated onto the negative-electrode active material; and defining the 1% aqueous solution viscosity of the carboxymethyl cellulose to a value equal to or more than 6000 mPa·s and equal to or less than 8000 mPa·s.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a graph that shows the relationship between the solid content rate during hard kneading and the number of defects (defect points), which depends on the amount of oil that has been adsorbed on the negative-electrode active material; and FIG. 3 is a diagram that shows how the characteristics of a lithium-ion battery change depending on the amount of oil that has been adsorbed on the negative-electrode active material, the viscosity of carboxymethyl cellulose (CMC) and the additive amount (weight percent) of CMC.

DETAILED DESCRIPTION OF EMBODIMENTS

Figure 1:
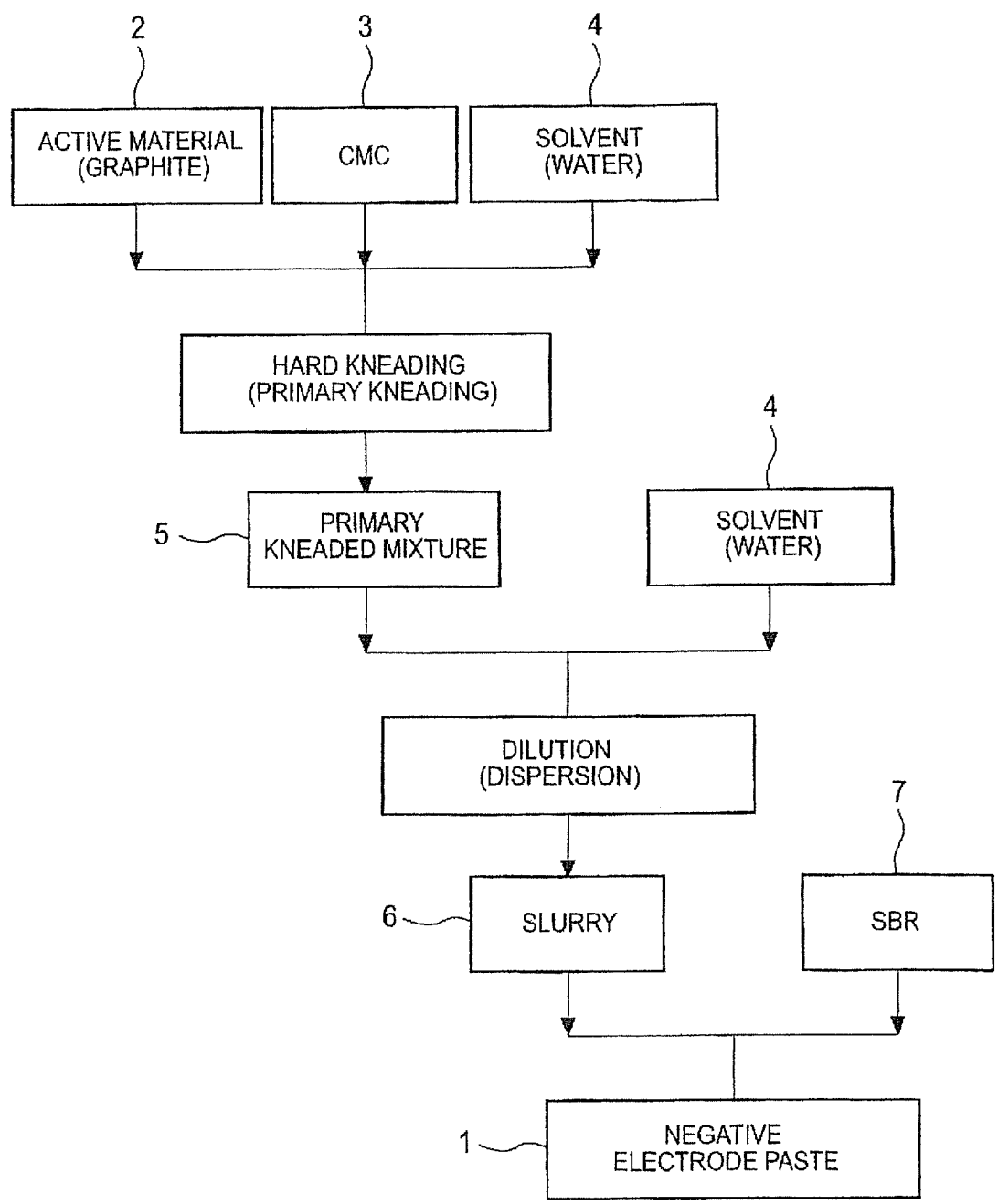
FIG. 1 is a schematic diagram that illustrates the flow of the production process of a negative electrode paste according to a method for producing a lithium-ion battery according to one embodiment of the present invention.

Description is hereinafter made of an embodiment of the present invention. First, the flow of the production process of a negative electrode paste in a method for producing a non-aqueous electrolyte secondary battery according to one embodiment of the present invention is described with reference to FIG. 1. In this embodiment, the non-aqueous electrolyte secondary battery is a lithium-ion battery.

As shown in FIG. 1, in the process of preparing a negative electrode paste 1, a mixture of graphite 2 as a negative-electrode active material, carboxymethyl cellulose (CMC) 3 as a thickening agent and water 4 as a solvent is subjected to hard kneading. The hard kneading is a process which is also called primary kneading, and may be carried out with a twin-screw extrusion-kneader, for example.

In the method for producing a lithium-ion battery according to one embodiment of the present invention, CMC which has a high viscosity is used as the CMC 3 that is added to prepare the hard-kneaded mixture. In one embodiment of the present invention, the viscosity of the CMC 3 that is used is particularly defined. Specifically, the CMC 3 for use in the method for producing a lithium-ion battery according to one embodiment of the present invention is defined to have a 1% aqueous solution viscosity of a value equal to or more than 6000 mPa·s and equal to or less than 8000 mPa·s.

In addition, in the method for producing a lithium-ion battery according to one embodiment of the present invention, oil (linseed oil) has been adsorbed on the graphite 2 that is used to prepare the hard-kneaded mixture. The amount of oil that is adsorbed on the graphite 2 (which is hereinafter referred to as "oil adsorption amount") is defined as described later. It should be noted that the "oil adsorption amount" used herein refers to the amount of oil that is adsorbed on the negative-electrode active material (graphite 2) when 70% of the maximum torque (100% torque) is generated, the maximum torque being generated when the linseed oil is titrated onto the negative-electrode active material (graphite 2) at a constant rate and the change in the viscosity characteristics at this time is measured and recorded with a torque detector. This oil adsorption amount is herein referred to as "oil adsorption amount at 70% torque." The oil adsorption amount at 70% torque may be herein also referred to simply as "oil adsorption amount."

Specifically, the negative-electrode active material (graphite 2) for use in the method for producing a lithium-ion battery according to one embodiment of the present invention has an oil adsorption amount of a value equal to or more than 50 ml/100 g and equal to or less than 62 ml/100 g. In other words, the oil adsorption amount is defined to be equal to or more than 50 ml and equal to or less than 62 ml per 100 g of the negative-electrode active material.

In the method for producing a lithium-ion battery according to one embodiment of the present invention, a solvent (water 4) is added to the material that is prepared as a result of the hard kneading (which is hereinafter referred to as "primary kneaded mixture 5") to dilute the primary kneaded mixture 5. In this way, a slurry 6 which is constituted by a medium that is formed of the solvent (water 4), the CMC 3 and so on and graphite particles that are dispersed in the medium is prepared. Then, SBR 7 (binder) is added to the slurry 6, in which graphite particles are dispersed, to prepare the negative electrode paste 1.

In this embodiment, the blend ratio of the graphite 2, the CMC 3 and the SBR 7 as solid matters that are contained in the negative electrode paste 1 is defined. When the total weight of the graphite 2, the CMC 3 and the SBR 7 (in other words, solid components) is taken as 100, the weight of the graphite 2 is 98.6, the weight of the CMC 3 is 0.7 and the weight of the SBR 7 is 0.7. In other words, in this embodiment, the negative electrode paste 1 is prepared to contain 0.7% by weight of CMC 3 based on the total weight of the solid components therein.

As described above, in the method for producing a lithium-ion battery according to one embodiment of the present invention, the amount of the CMC 3 that is used (which is hereinafter referred to as "CMC additive amount") is defined. Specifically, the CMC additive amount in the method for producing a lithium-ion battery according to one embodiment of the present invention is defined to be equal to or more than 0.6% by weight and equal to or less than 0.8% by weight of the CMC 3 (based on the total weight of the solid components).

Then, the negative electrode paste 1, which is prepared to satisfy the above conditions, is coated on a copper foil, which then undergoes drying, pressing and slitting steps to produce a negative electrode (negative plate). The produced negative electrode is wound together with a positive electrode and a separator to produce a wound body, and the wound body is housed in a case. Then, the case is sealed after an electrolytic solution is injected into the case, whereby a lithium-ion battery (not shown) with a capacity of 4 Ah is produced.

The characteristics of the lithium-ion battery that is produced by the method for producing a lithium-ion battery according to one embodiment of the present invention are next described with reference to FIG. 1 and FIG. 2. FIG. 2 shows how the relationship between the solid content rate during hard kneading and the number of defects (i.e., defect points) that are generated during coating changes when the oil adsorption amount of the negative-electrode active material (graphite 2) is changed. The "defects" that are generated during coating herein refers failures in which undissolved CMC residues adhere to the current-collecting foil (copper foil) to form local regions which does not contain the negative-electrode active material (active material-free regions). More specifically, only defects that are presumed to be derived from CMC microgel are treated as defects. The term "solid content rate" used herein refers to the percentage by weight of the negative-electrode active material (graphite 2)

and the CMC 3 (in other words, the total weight except the solvent (water 4)) based on the total weight of the primary kneaded mixture 5.

It can be understood from FIG. 2 that when the oil adsorption amount is 47.2 ml/100 g (namely, when the oil adsorption amount is less than the defined value (50 ml/100 g) of the oil adsorption amount in the method for producing a lithium-ion battery according to one embodiment of the present invention), for example, the solid content rate increases during the hard kneading until the amount of water is insufficient to dissolve the CMC 3 completely. In this case, the incomplete dissolution of the CMC 3 leads to an increase in the number of defects. Specifically, the number of defects is approximately 200/m$^2$ or greater.

It can be also understood from FIG. 2 that the number of defects tends to decrease when the oil adsorption amount of the negative-electrode active material (graphite 2) is increased. FIG. 2 also indicates that when the oil adsorption amount is in the range which includes the specified value in the method for producing a lithium-ion battery according to one embodiment of the present invention (equal to or more than 50 ml/100 g and equal to or less than 62 ml/100 g), the number of defects can be reduced to approximately 200/m$^2$ or less by adjusting the solid content rate during the hard kneading.

FIG. 2 also indicates that even when the oil adsorption amount of the negative-electrode active material (graphite 2) is increased, the shear force during the hard kneading will be insufficient to dissolve the CMC 3 completely, resulting in an increase in the number of defects, when the solid content rate during the hard kneading is too low.

FIG. 2 further indicates that the increase in the number of defects due to shortage of water during the hard kneading (insufficient dissolution of the CMC 3) can be prevented by adjusting the solid content rate during the hard kneading to 70% or lower. This is the reason why the defined value of the solid content rate during the hard kneading is defined to 70% or lower in the method for producing a lithium-ion battery according to one embodiment of the present invention.

In the method for producing a lithium-ion battery according to one embodiment of the present invention, the solid content rate during the hard kneading for preparation of the primary kneaded mixture 5 is adjusted to 70% or lower. This configuration ensures complete dissolution of the CMC 3 during the hard kneading, which leads to a decrease in the number of defects in the resulting negative electrode.

The characteristics of the lithium-ion battery that is produced by the method for producing a lithium-ion battery according to one embodiment of the present invention are described in more detail with reference to FIG. 1 and FIG. 3. FIG. 3 summarizes the results of the following experiments (1) to (3).

In experiment (1), it was determined how the performance of a lithium-ion battery changes when the oil adsorption amount of the negative-electrode active material (graphite 2) is changed with the viscosity and additive amount of the CMC 3 being maintained constant. In this case, the number of defects, peeling strength, initial resistance and post-cycle capacity retention rate were selected as indicators which indicate the change in the performance of the lithium-ion battery. The initial resistance may be regarded as an indicator that indicates how good or poor the output characteristics are. In other words, a lithium-ion battery with a lower initial resistance may be determined to have better output characteristics. The post-cycle capacity retention rate may be regarded as an indicator which indicates how good or poor the cycle characteristics are. A lithium-ion battery with a higher post-cycle capacity retention rate may be determined to have better cycle characteristics.

In experiment (2), it was determined how the performance of a lithium-ion battery changes when the additive amount of the CMC 3 is changed with the oil adsorption amount of the negative-electrode active material (graphite 2) and the viscosity of the CMC 3 being maintained constant. In experiment (3), it was determined how the performance of a lithium-ion battery changes when the viscosity of the CMC 3 is changed.

The number of defects was determined in each of experiments (1) to (3) as described below. Five samples with a size of 10 cm×50 cm were cut from the negative plate after pressing, and the average of the number of defects in the five samples was calculated. Then, the number of defects per unit area was calculated by dividing the average number of defects by the area of the samples (0.05 m$^2$).

The peeling strength was calculated in each of experiments (1) to (3) as described below. A sample was prepared by cutting the negative plate after pressing into a width of 15 mm, and the sample was subjected to a 90-degree peeling test to calculate the peeling strength. The method for calculating the peeling strength is described in more detail. The coated side of the sample which was obtained by cutting the negative plate after pressing into a width of 15 mm was bonded to a glass plate with a double-sided tape. Then, the strength (the stress necessary to peel the negative plate) at which one end of the negative plate was peeled off from the glass plate at a constant rate was measured while the negative plate was maintained at an angle of 90° with respect to the glass plate. Then, the value that was obtained by dividing the strength by the width 15 mm was defined as the peeling strength.

In each of experiments (1) to (3), the initial resistance was calculated from the voltage drop which was measured when the lithium-ion battery was discharged at 25° C., 3.7 V and 20 A for 10 seconds. The method for calculating the initial resistance is described in more detail. The battery was charged to 3.7 V and then discharged at a discharge current of 20 A for 10 seconds at 25° C. The voltage drop $\Delta V$ was obtained by subtracting V1, the battery voltage that was measured after 10 seconds from the start of discharge, from V0, the battery voltage before discharge. Then, the value that was obtained by dividing the voltage drop $\Delta V$ by 20 A (discharge current) was defined as the initial resistance.

In each of experiments (1) to (3), the post-cycle capacity retention rate was calculated from the ratio of capacities before and after 1,000 charge/discharge cycles that were performed at −10° C., 3.0 to 4.1 V and 4 A. The method for calculating the post-cycle capacity retention rate is described in more detail. The battery was charged to 4.1 V at a constant current (CC) at 25° C. After a 10-minute interval, the battery was discharged to 3.0 V at a constant current of 4 A. The discharge capacity at this time was defined as the pre-cycle battery capacity. In the cycle test, 1,000 charge/discharge cycles were performed. Each of 1,000 charge/discharge cycles consists of charging to 4.1 V at a constant current of 4 A at −10° C., a 10-minute interval and discharging to 3.0 V at a constant current of 4 A. After the cycle test, the battery was charged to 4.1 V at a constant current (CC) at 25° C. Then, after a 10-minute interval, the battery was discharged to 3.0 V at a constant current of 4 A. The discharge capacity at this time was defined as the post-cycle battery capacity. Then, the rate (%) obtained by dividing the post-cycle battery capacity by the pre-cycle battery capacity was defined as the post-cycle capacity retention rate.

First, the results of experiment (1) are discussed. In experiment (I), it was determined how the performance of a lithium-ion battery changes when the oil adsorption amount of the negative-electrode active material (graphite 2) is changed with the viscosity and additive amount of the CMC 3 being maintained constant.

In the lithium-ion batteries corresponding to Examples 1 to 4 that are shown in FIG. 3, the oil adsorption amount of the negative-electrode active material (graphite 2) was equal to or more than 50 ml/100 g and equal to or less than 62 ml/100 g. In other words, the oil adsorption amount of the negative-electrode active material in Examples 1 to 4 satisfied the defined value of the oil adsorption amount of the negative-electrode active material in the method for producing a lithium-ion battery according to one embodiment of the present invention. In contrast, the lithium-ion batteries corresponding to Comparative Examples 1 and 2 that are shown in FIG. 3 did not satisfy the defined value of the oil adsorption amount of the negative-electrode active material (graphite 2) in one embodiment of the present invention.

The lithium-ion batteries that are shown in Examples 1 to 4, which had approximately 100 defects/m$^2$ or less and a peeling strength of 2.2 to 2.7 N/m, received a good evaluation in terms of the number of defects and peeling strength. The lithium-ion batteries that are shown in Examples 1 to 4, which had a post-cycle capacity retention rate of 91 to 94%, also received a good evaluation in terms of the post-cycle capacity retention rate.

In contrast, the lithium-ion battery that is shown in Comparative Example 1, which had a peeling strength of 2.9 N/m and 234 defects/m$^2$, received a good evaluation in terms of the peeling strength but received a worse evaluation than the lithium-ion batteries that are shown in Examples 1 to 4 in terms of the number of defects. The lithium-ion battery that is shown in Comparative Example 1 had a post-cycle capacity retention rate of 65%. Thus, the lithium-ion battery that is shown in Comparative Example 1 received a worse evaluation than the lithium-ion batteries that are shown in Examples 1 to 4 in terms of the post-cycle capacity retention rate (in other words, in terms of cycle characteristics). It is believed that, in Comparative Example 1, an insufficient oil adsorption amount led to an insufficient amount of water during the primary kneading, which in turn led to an increase in undissolved residues of the CMC 3, resulting in an increase in the number of defects. It is also believed that the increase of defects induced precipitation of Li during the cycles, leading to a low post-cycle capacity retention rate.

The lithium-ion battery that is shown in Comparative Example 2, which had 14 defects/m$^2$ and a peeling strength of 1.1 N/m, received a good evaluation in terms of the number of defects but received a worse evaluation than the lithium-ion batteries that are shown in Examples 1 to 4 in terms of the peeling strength. The lithium-ion battery that is shown in Comparative Example 2, which had a post-cycle capacity retention rate of 78%, received a worse evaluation than the lithium-ion batteries that are shown in Examples 1 to 4 in terms of the post-cycle capacity retention rate (in other words, in terms of the cycle characteristics). It is believed that, in Comparative Example 2, an excessive oil adsorption amount led to an increase of adsorption of CMC on the negative-electrode active material (graphite 2), resulting in a low peeling strength. It is also believed that the low peeling strength led to a low post-cycle capacity retention rate.

The results of experiment (1) show that it is possible to, when the oil adsorption amount of the negative-electrode active material (graphite 2) is adjusted in the range from a value equal to or more than 50 ml/100 g to a value equal to or less than 62 ml/100 g, produce a lithium-ion battery where the number of defects can be reduced while maintaining the peeling strength with a high post-cycle capacity retention rate.

The results of experiment (2) are next discussed. In experiment (2), it was determined how the performance of a lithium-ion battery changes when the additive amount of the CMC 3 (more specifically, the percentage by weight of the CMC 3 based on the total weight of the solid components) is changed with the oil adsorption amount of the negative-electrode active material (graphite 2) and the viscosity of the CMC 3 being maintained constant.

In the lithium-ion batteries corresponding to Examples 5 and 6 that are shown in FIG. 3, the percentage by weight of the CMC 3 (based on the total weight of solid components) was equal to or more than 0.6% and equal to or less than 0.8%. In other words, the lithium-ion batteries corresponding to Examples 5 and 6 satisfied the defined value of the additive amount of the CMC 3 in the method for producing a lithium-ion battery according to one embodiment of the present invention. In contrast, the lithium-ion batteries corresponding to Comparative Examples 3 and 4 that are shown in FIG. 3 did not satisfy the defined value of the additive amount of the CMC 3 in one embodiment of the present invention.

The lithium-ion batteries that are shown in Examples 5 to 6, which had approximately 50 defects/m$^2$ or less and a peeling strength of 2.2 to 2.7 N/m, received a good evaluation in terms of the number of defects and peeling strength. The lithium-ion batteries that are shown in Examples 5 and 6, which had a post-cycle capacity retention rate of 92 to 93%, also received a good evaluation in terms of the post-cycle capacity retention rate. In addition, the lithium-ion batteries that are shown in Examples 5 and 6, which had an initial resistance of 4.375 to 4.563 mΩ, also received a good evaluation in terms of the initial resistance.

In contrast, the lithium-ion battery that is shown in Comparative Example 3, which had 10 defects/m$^2$ and a peeling strength of 1.3 N/m, received a good evaluation in terms of the number of defects but received a worse evaluation than the lithium-ion batteries that are shown in Examples 5 and 6 in terms of the peeling strength. The lithium-ion battery that is shown in Comparative Example 3, which had a post-cycle capacity retention rate of 76%, received a worse evaluation than the lithium-ion batteries that are shown in Examples 5 and 6 in terms of the post-cycle capacity retention rate (in other words, in terms of the cycle characteristics). It is believed that, in Comparative Example 3, the peeling strength was poor because the additive amount of the CMC 3 was insufficient. It is also believed that the low peeling strength led to a low post-cycle capacity retention rate.

In contrast, the lithium-ion battery that is shown in Comparative Example 4, which had a peeling strength of 4.1 N/m, received a good evaluation in terms of the peeling strength. However, the lithium-ion battery that is shown in Comparative Example 4, which had 190 defects/m$^2$, received a worse evaluation than the lithium-ion batteries that are shown in Examples 5 and 6 in terms of the number of defects. The lithium-ion battery that is shown in Comparative Example 4, which had a post-cycle capacity retention rate of 61%, received a worse evaluation than the lithium-ion batteries that are shown in Examples 5 and 6 in terms of the post-cycle capacity retention rate (in other words, in terms of the cycle characteristics). In addition, the lithium-ion battery that is shown in Comparative Example 4, which had an initial resistance of 5.988 mΩ, received a worse evaluation than the lithium-ion batteries that are shown in Examples 5 and 6 in terms of the initial resistance (in other words, in terms of the output characteristics). It is believed that, in Comparative Example 4, the additive amount of the CMC 3 was so large that the CMC 3 inhibited the battery reaction, resulting in an increase in the initial resistance. It is also believed that the additive amount of the CMC 3 was so large that undissolved residues of the CMC 3 increased, resulting in an increase in the number of defects. It is also believed that the increase of defects induced precipitation of Li during the cycles, leading to a low post-cycle capacity retention rate.

The results of experiment (2) show that it is possible to, when the additive amount of the CMC 3 is adjusted in the range from a value equal to or more than 0.6% by weight to a value equal to or less than 0.8% by weight based on the total weight of solid components (the graphite 2, the CMC 3 and the SBR 7), produce a lithium-ion battery where the number of defects can be reduced while maintaining the peeling strength with a high post-cycle capacity retention rate.

The results of experiment (3) are next discussed. In experiment (3), it was determined how the performance of a lithium-ion battery changes when the viscosity of the CMC 3 is changed.

In the lithium-ion battery corresponding to Example 7 that is shown in FIG. 3, the CMC 3 had a 1% aqueous solution viscosity that is equal to or more than 6000 mPa·s and equal to or less than 8000 mPa·s. In other words, the lithium-ion battery corresponding to Example 7 satisfied the defined value of the viscosity of the CMC 3 in the method for producing a lithium-ion battery according to one embodiment of the present invention. In contrast, the lithium-ion battery corresponding to Comparative Example 5 had a viscosity that was lower than the defined value of the viscosity of the CMC 3 in one embodiment of the present invention. When the CMC 3 has a low viscosity, the slurry 6 and the SBR 7 cannot be converted into a paste without increasing the additive amount of the CMC 3. Thus, when the experiment was conducted, the additive amount of the CMC 3 was increased to 1% by weight, which was greater than that in Example 7.

The lithium-ion battery that is shown in Example 7, which had 44 defects/m² and a peeling strength of 2.6 N/m, received a good evaluation in terms of the number of defects and peeling strength. The lithium-ion battery that is shown in Example 7, which had a post-cycle capacity retention rate of 93%, also received a good evaluation in terms of the post-cycle capacity retention rate. In addition, the lithium-ion battery that is shown in Example 7, which had an initial resistance of 4.478 mΩ, also received a good evaluation in terms of the initial resistance.

The lithium-ion battery that is shown in Comparative Example 5, which had 14 defects/m² and a peeling strength of 2.3 N/m, received a good evaluation in terms of the number of defects and peeling strength. However, the lithium-ion battery that is shown in Comparative Example 5, which had a post-cycle capacity retention rate of 71%, received a worse evaluation than the lithium-ion battery that is shown in Example 7 in terms of the post-cycle capacity retention rate (in other words, in terms of the cycle characteristics). In addition, the lithium-ion battery that is shown in Comparative Example 5, which had an initial resistance of 5.121 mΩ, also received a worse evaluation than the lithium-ion batteries that is shown in Example 7 in terms of the initial resistance (in other words, in terms of the output characteristics). It is believed that because the additive amount of the CMC 3 was increased since a paste cannot be formed without increasing the additive amount of the CMC 3 when the CMC 3 has a low viscosity, the CMC 3 inhibited the battery reaction, leading to an increase in the initial resistance. It is also believed that the increase in the battery resistance caused precipitation of Li during the cycles, leading to a low post-cycle capacity retention rate.

The results of experiment (3) shows that when the 1% aqueous solution viscosity of the CMC 3 is adjusted in the range from a value equal to or higher than 6,000 mPa·s and to a value equal to or less than 8,000 mPa·s, the number of defects can be reduced while maintaining the peeling strength maintained and a lithium-ion battery with a high post-cycle capacity retention rate can be produced.

The method for producing a lithium-ion battery according to one embodiment of the present invention includes: subjecting a mixture of a negative-electrode active material (graphite 2) on which oil has been adsorbed, CMC 3 and water 4 to hard kneading to prepare a primary kneaded mixture 5; diluting the primary kneaded mixture 5 with water 4 to prepare a slurry 6; adding a binder 7 to the slurry 6 to prepare a negative electrode paste 1; defining an amount of the oil that is adsorbed on the graphite 2 to a value equal to or more than 50 ml/100 g and equal to or less than 62 ml/100 g, wherein the amount of the oil is an amount at the time when the viscosity characteristics of the graphite 2 exhibits 70% of the maximum torque that is generated when an oil is titrated onto the graphite 2; and defining the 1% aqueous solution viscosity of the CMC 3 to a value equal to or more than 6000 mPa·s and equal to or less than 8000 mPa·s. The method for producing a lithium-ion battery according to one embodiment of the present invention further includes defining the amount of use of the CMC 3 (the additive amount of the CMC 3) so that the percentage by weight of the CMC 3 based on the total weight of the graphite 2, the CMC 3 and the SBR 7 as solid components that are contained in the negative electrode paste 1 is equal to or more than 0.6% and equal to or less than 0.8%. Such a configuration ensures a high peeling strength in a negative electrode even when CMC 3 with a high viscosity is used. Thus, it is possible to provide a lithium-ion battery with sufficient output characteristics and cycle characteristics.

A lithium-ion battery according to one embodiment of the present invention includes a negative electrode that is produced from the negative electrode paste 1 that is produced by the method for producing a lithium-ion battery according to one embodiment of the present invention. This configuration ensures the provision of a lithium-ion battery with sufficient output characteristics and cycle characteristics.

As described above, according to embodiments of the present invention, a high peeling strength can be ensured in the negative electrode even when CMC with a high viscosity is used, and it is possible to provide a lithium-ion battery with sufficient output characteristics and cycle characteristics. In addition, the CMC can be dissolved completely during the hard kneading and the number of defects in the negative electrode can be reduced.

What is claimed is:

1. A method for producing a non-aqueous electrolyte secondary battery, comprising:
subjecting a mixture of a negative-electrode active material on which oil has been adsorbed, wherein an amount of the oil that is adsorbed on the negative-electrode active material ranges from 50 ml to 62 ml per 100 g of the negative-electrode active material, and the amount of the oil is an amount at the time when the viscosity characteristics of the negative-electrode active material exhibits 70% of the maximum torque that is generated when the oil is titrated onto the negative-electrode active material, carboxymethyl cellulose, wherein a 1% aqueous solution viscosity of the carboxymethyl cellulose ranges from 6000 mPa·s to 8000 mPa·s, and water to kneading to prepare a primary kneaded mixture;

diluting the primary kneaded mixture with water to prepare a slurry; and adding a binder to the slurry to prepare a negative electrode paste.

2. The method according to claim 1, wherein
a percentage by weight of the carboxymethyl cellulose contained in the negative electrode paste, based on the total weight of the negative-electrode active material, the carboxymethyl cellulose and the binder, ranges from 0.6% to 0.8%.

3. The method according to claim 1, further comprising
adjusting a solid content rate during the kneading to form the primary kneaded mixture to a value equal to or less than 70%.

4. A non-aqueous electrolyte secondary battery, comprising
a negative electrode which is produced from the negative electrode paste that is prepared by the method according to claim 1.

5. A method for producing a negative electrode paste, comprising:
subjecting a mixture of a negative-electrode active material on which oil has been adsorbed, wherein an amount of the oil that is adsorbed on the negative-electrode active material ranges from 50 ml to 62 ml per 100 g of the negative-electrode active material, and the amount of the oil is an amount at the time when the viscosity characteristics of the negative-electrode active material exhibits 70% of the maximum torque that is generated when the oil is titrated onto the negative-electrode active material, carboxymethyl cellulose, wherein a 1% aqueous solution viscosity of the carboxymethyl cellulose ranges from 6000 mPa·s to 8000 mPa·s, and water to kneading to prepare a primary kneaded mixture;

diluting the primary kneaded mixture with water to prepare a slurry; and adding a binder to the slurry.

6. The method according to claim 5, wherein
a percentage by weight of the carboxymethyl cellulose contained in the slurry, based on the total weight of the negative-electrode active material, the carboxymethyl cellulose and the binder, ranges from 0.6% to 0.8%.

7. The method according to claim 5, further comprising
adjusting a solid content rate during the kneading to form the primary kneaded mixture to a value equal to or less than 70%.

* * * * *